2,821,424

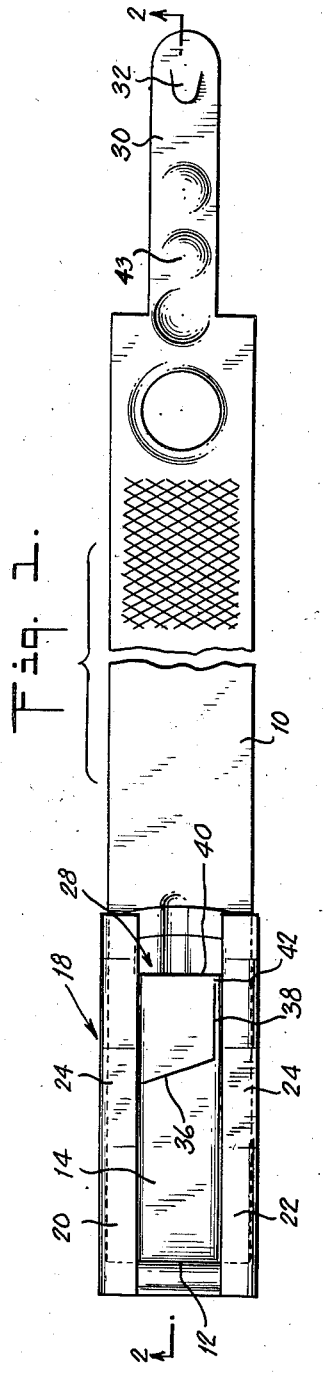
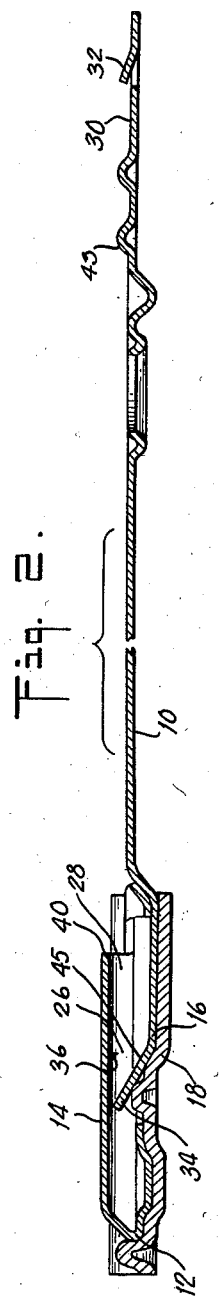
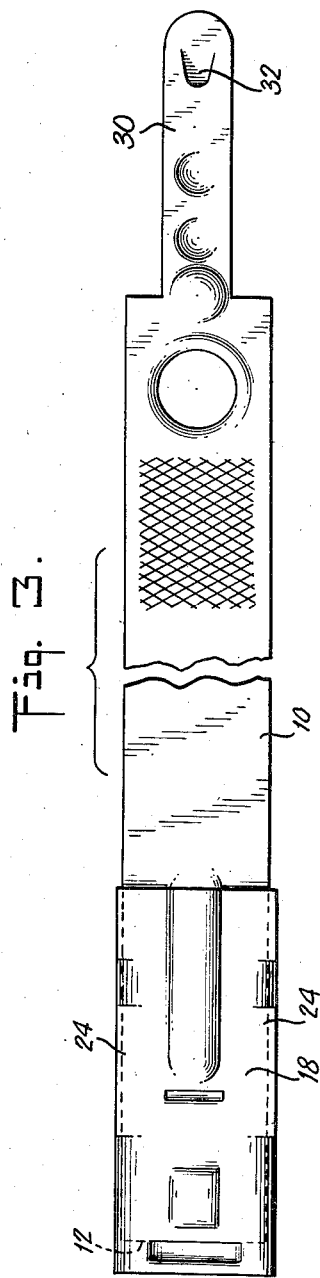
INVENTOR.
WINFRED M. BROOKS
BY Robert Henderson
ATTORNEY Jan. 28, 1958  W. M. BROOKS  2,821,424
SHACKLE SEAL
Filed Aug. 2, 1955  2 Sheets-Sheet 2
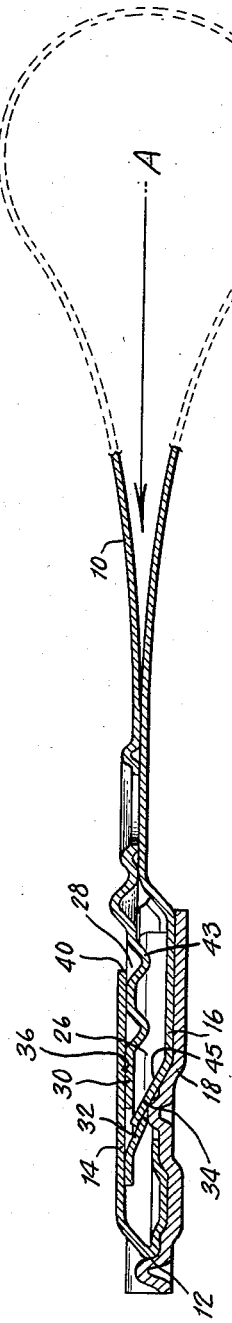
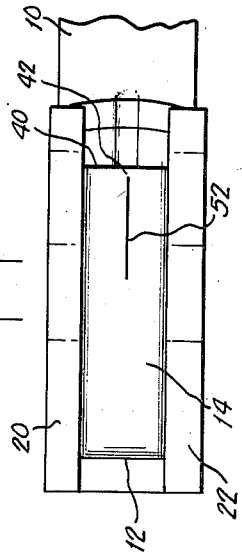
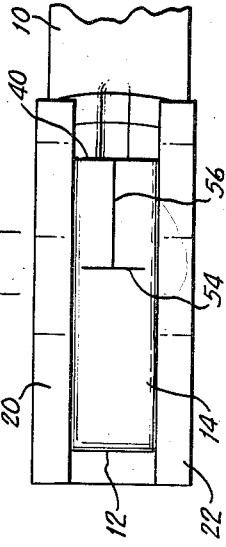
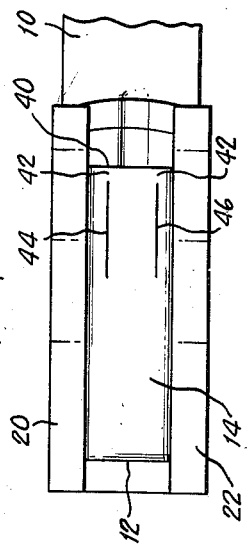
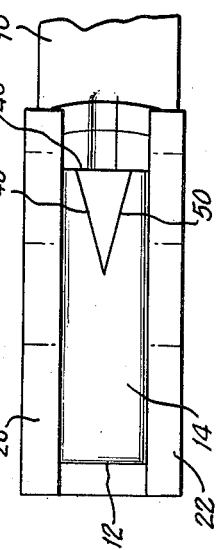
INVENTOR.
WINFRED M. BROOKS
BY
Robert Henderson
ATTORNEY United States Patent Office 2,821,424
Patented Jan. 28, 1958

SHACKLE SEAL

Winfred M. Brooks, West Orange, N. J., assignor to E. J. Brooks Company, Newark, N. J., a corporation of New Jersey Application August 2, 1955, Serial No. 525,875

5 Claims. (Cl. 292—317)

The present invention constitutes an improvement upon self-locking shackle seals of the general character disclosed in my patents No. 2,481,815, dated September 13, 1949, and No. 2,761,720, dated September 4, 1956. While the inventions of said patents relate generally to improved locking means, the present invention is concerned, more particularly, with means by which the seal becomes partially broken if tampered with, thereby giving clear evidence of such tampering.

The principal object of this invention, therefore, is the provision of an improved shackle seal which will give evidence of tampering.

According to the present invention, in its broader aspects, said object is accomplished by forming a lock-housing portion with areas or lines of weakness so formed and located therein that said lock-housing portion remains undisturbed and undeformed when the seal is closed in a normal manner, but becomes torn or considerably deformed if a prying instrument is inserted thereunder in an effort to open the seal. Such an effort may be made by an unauthorized person and the tear or deformation serves to disclose such tampering even if said person succeeds in opening and reclosing the seal.

Several embodiments of this invention are shown for illustrative purposes in the accompanying drawings without, however, limiting the invention to those particular embodiments.

In the drawings:

Figure 1 is a top plan view of an open shackle seal according to a preferred embodiment (hereinafter referred to as the "first embodiment") of this invention.

Fig. 2 is a central, longitudinal, sectional view, substantially on the line 2—2 of Fig. 1.

Fig. 3 is a bottom plan view of the seal of Figs. 1 and 2.

Fig. 4 is a central, longitudinal, sectional view of said seal when closed.

Figs. 5–8, inclusive, are fragmentary, top plan views showing lock-housing portions of four different further embodiments of the invention.

Referring to the first embodiment, illustrated in Figs. 1–4, the seal comprises a band 10 formed of thin sheet metal which preferably is quite pliant so that it may be bent to some extent without breaking or becoming weakened but which, nevertheless, possesses a limited degree of resilience. The band 10 is bent sharply at transverse line 12, toward one end of the band, and top and bottom lock-housing portions 14 and 16, at opposite sides of said transverse line, are brought together and thus held by a clamping member 18 of sheet metal, the main portion of which underlies bottom lock-housing portion 16 and opposite marginal portions 20 and 22 of which are folded tightly about opposed margins of lock-housing portions 14 and 16 to hold the two latter together. The marginal portions 20 and 22 and the margins of lock-housing portions 14 and 16, held therewithin, may be crimped as at 24 to enhance the rigidity of said parts.

The lock-housing portions 14 and 16 of the band and the clamping member 18 are so formed as to provide an elongate cavity 26, having an opening 28 at its inner end, said cavity thereby being adapted to receive endwisely therein a locking tongue 30, of reduced width, formed on the opposite end of band 10.

The lock-housing portions 14 and 16 and the tongue 30 are so formed that, when the band 10 has been partially passed through a hasp assembly of a door of a railroad car or other vehicle (not shown) and then bent and the tongue 30 inserted into cavity 26 as shown in Fig. 4, the tongue will be held against withdrawal from said cavity. One shape into which the lock-housing portions 14 and 16 and tongue 30 may be formed for said locking purpose is illustrated in Figs. 1–4, although numerous variations may be made in the shapes of said locking parts. If said parts are shaped as shown in the drawings, a bent prong 32 on the tongue 30 snaps into locking engagement with and in back of a bent prong 34 of bottom lock-housing portion 16, whereby withdrawal of the tongue from cavity 26 is prevented.

The structure thus far described is generally similar to that shown in my mentioned Patent No. 2,481,815 to which reference may be had if necessary.

It may be seen that the described seal cannot be opened in any normal manner because of the interlocking of the prongs 32 and 34 which, largely because of the restricted size of the cavity 26, cannot be folded back upon themselves. However, unauthorized or dishonest persons may desire to gain access to a vehicle to which one of these seals has been applied and to replace the seal thereafter to make it appear that no tampering or unauthorized access has occurred.

Assuming that an unauthorized person has gained knowledge as to the structure of such a seal, and such knowledge can be acquired quite easily, that person may insert a long, narrow, thin instrument, such as a narrow, thin blade of a long knife, leftwardly between the two ends of the band 10 where indicated by arrow A in Fig. 4. If the tongue 30 is pushed as far into the cavity 26 as possible so that the prongs 32 and 34 are not in transverse alignment, the instrument may be used to hold down prong 34 so that it will not interlock with the prong 32 while tongue 30 is thereafter being pulled rightwardly and withdrawn from the cavity 26. Then, after gaining access to the contents of the vehicle, the vehicle door may be closed and resealed with the same seal, thereby making it appear that there has been no tampering. Such seals, of course, are commonly numbered to forestall substitution of a new seal.

In prior seals of the general character described, the parts defining the cavity 26 have been quite strong and would not be broken or materially deformed if an instrument were used to open the seal in the manner described.

According to the present invention, however, the top lock-housing portion 14 is made only strong enough to resist breaking or material deformation if the seal is closed in the proper manner as described. It is not strong enough, however, to resist breaking or becoming materially deformed if a blade or equivalent instrument is used to open the seal in the manner described.

Pursuant to the just-stated principle, the top lock-housing portion 14 of Figs. 1–4, preferably prior to the clamping of that portion to bottom lock-housing portion 16 by clamping member 18, is scored, preferably on its inner surface, along a transverse line 36 and an adjoining longitudinal line 38 which preferably terminates a short distance, about 1/32 of an inch, from end 40 of said top lock-housing portion, thereby forming a small bridge or unscored portion 42. Thus, if such a blade or the like is employed in the manner described, it will impose sufficient strain on the small bridge 42 to break the latter and cause the portion 14 to tear along line 38 and more or less completely along line 36. In that condition, even if the seal is opened and reclosed, the broken portion 14 gives clear evidence of the tampering that has occurred.

A feature which may be employed to give added assurance that tampering will rupture the portion 14 resides in the provisions, on the inner side of tongue 30, of an instrument-deflecting portion 43 so located as to interfere with an instrument inserted leftwardly coincident with arrow A as already explained. Initial engagement of such an instrument with the portion 43 tends to force tongue 30 upwardly and thus to rupture the portion 14. If such rupturing does not then occur, further leftward movement of the instrument, prior to any possible coaction of the latter with either of prongs 32, 34, causes the end of said instrument to engage and ride upwardly on inclined surface 45 whereupon the tongue is pressed upwardly or outwardly so forcefully against portion 14 that breakage of the latter is certain to occur.

The scoring at lines 36 and 38 need not necessarily be any deeper than needed to constitute said lines as lines of weakness in comparison with other areas of the lock-housing portion 14. If the scoring is relatively light, the bridge 42 may be omitted and line 38 extended completely to end 40 of the lock-housing portion. The deeper the scoring is made, the more necessary becomes the provision of the bridge 42. The conditions recited in this paragraph apply also to the other embodiments hereinafter described.

The second embodiment of Fig. 5 differs from other disclosed embodiments in that it has longitudinal lines of weakness 44 and 46 which are in non-adjoining relationship.

The third embodiment of Fig. 6 has lines of weakness 48 and 50 converging from end 40 of the lock-housing portion 14. Fig. 6 illustrates such lines of weakness which extend completely to end 40.

The fourth embodiment of Fig. 7 has only a single, central, longitudinal line of weakness 52.

The fifth embodiment of Fig. 8 has two adjoining lines of weakness 54 and 56 in T formation. Here, again, no bridge 42 need be provided. The line 56 may extend completely to end 40 of the lock-housing portion 14.

It will readily be perceived that various types of perforations may be substituted for the mentioned scoring to provide lines or areas of weakness, in which event a bridge 42 or equivalent non-perforated area must be provided. It will be understood, also, that various scoring arrangements may be employed within this invention other than those illustrated and described herein.

I claim:

1. A shackle seal comprising an elongate bendable element adapted to be bent into a loop to form a shackle, a locking chamber at one end of said element having an external wall of a flat, single thickness of sheet metal, an end edge of which partially defines an end opening of said chamber, a locking tongue at the other end of said element and adapted for insertion through said end opening and into said chamber and to remain in said chamber and in the latter's said opening when the seal is closed, interengageable locking means within said chamber and on said tongue adapted to hold the latter against withdrawal from said chamber, and weakening means in said external wall adjacent to said end edge adapting said wall to break upon insertion of an instrument into said chamber through the latter's said end opening while said tongue is disposed therein.

2. A shackle seal according to claim 1, said weakening means comprising a scored line extending longitudinally of said external wall and terminating adjacent to said end edge of said wall, said scored line being toward one side of said external wall and approximately perpendicular to said end edge, and said weakening means further including a second scored line extending obtusely from the end of the first-mentioned scored line, which is remote from said end edge, toward the opposite side of said external wall.

3. A shackle seal according to claim 1, said weakening means comprising a scored line extending longitudinally of said external wall and terminating adjacent to said end edge of said wall, said scored line being centrally located with respect to said external wall and approximately perpendicular to said end edge, and said weakening means further including a second scored line, perpendicular to said first-mentioned scored line; the latter, at its end which is remote from said end edge, adjoining said second scored line intermediately of the latter.

4. A shackle seal according to claim 1, said locking tongue having, on its face farthest from said external wall, instrument-deflecting portion which, when the seal is closed, is in interfering position with respect to an instrument inserted endwisely through said end opening whereby to tend to deflect such an instrument away from said locking tongue and thereby cause said tongue to be urged forcibly against said external wall of the locking chamber to fracture said wall.

5. A shackle seal according to claim 1, said weakening means comprising two scored lines extending longitudinally of said external wall in converging relation to each other and terminating adjacent to said end edge of said wall.

References Cited in the file of this patent

UNITED STATES PATENTS

| | | |
|---|---|---|
| 745,036 | Brooks | Nov. 24, 1903 |
| 997,186 | Flora | July 4, 1911 |
| 1,102,262 | Gordon | July 7, 1914 |
| 1,497,993 | Smart | June 17, 1924 |
| 1,522,599 | Stodgell | Jan. 13, 1925 |
| 1,863,041 | Dessauer | June 14, 1932 |
| 2,481,815 | Brooks | Sept. 13, 1949 |
| 2,611,199 | Stelzer | Sept. 23, 1952 |